US012544166B2

(12) United States Patent
Wang

(10) Patent No.: US 12,544,166 B2
(45) Date of Patent: Feb. 10, 2026

(54) MASTER-END OPERATING DEVICE AND SURGICAL ROBOT

(71) Applicant: CORNERSTONE TECHNOLOGY (SHENZHEN) LIMITED, Guangdong (CN)

(72) Inventor: Zerui Wang, Guangdong (CN)

(73) Assignee: CORNERSTONE TECHNOLOGY (SHENZHEN) LIMITED, Shenzhen (CN)

( * ) Notice: Subject to any disclaimer, the term of this patent is extended or adjusted under 35 U.S.C. 154(b) by 69 days.

(21) Appl. No.: 18/586,345

(22) Filed: Feb. 23, 2024

(65) Prior Publication Data

US 2024/0197422 A1 Jun. 20, 2024

Related U.S. Application Data

(63) Continuation of application No. PCT/CN2022/116385, filed on Aug. 31, 2022.

(30) Foreign Application Priority Data

Dec. 31, 2021 (CN) .......................... 202111665845.9
Feb. 24, 2023 (CN) .......................... 202310207644.7

(51) Int. Cl.
   *A61B 34/37* (2016.01)
   *A61B 34/00* (2016.01)
   *A61B 34/30* (2016.01)

(52) U.S. Cl.
   CPC .............. *A61B 34/37* (2016.02); *A61B 34/75* (2016.02); *A61B 34/76* (2016.02); *A61B 2034/305* (2016.02)

(58) Field of Classification Search
   CPC ......... A61B 34/37; A61B 34/75; A61B 34/76; A61B 2034/305; A61B 34/30; A61B 34/74

See application file for complete search history.

(56) References Cited

U.S. PATENT DOCUMENTS

2003/0060927 A1* 3/2003 Gerbi .................... A61B 34/71
                                                  606/130
2019/0239972 A1* 8/2019 Chassot ................ B25J 9/1682
(Continued)

FOREIGN PATENT DOCUMENTS

CN          103687701 A       3/2014
CN          107414780 A      12/2017
(Continued)

OTHER PUBLICATIONS

Cornerstone Technology (Shenzhen) Limited, International Search Report with English translation, PCT/CN2022/116385, Nov. 29, 2022, 5 pgs.

(Continued)

*Primary Examiner* — Harry Y Oh
(74) *Attorney, Agent, or Firm* — ScienBiziP, P.C.

(57) ABSTRACT

The master-end operating device includes a device body, operating mechanisms, a movable member and an elastic member. The operating mechanisms are pivotably connected to the device body, and each is provided with a respective driving part. The movable member is at least partially disposed within the device body and configured to be movable in an axial direction of the device body, where the movable member is provided with follower parts, each of which interferes with the respective driving part to enable the movable member to be movable in the axial direction. The respective follower part has a first constraint surface, which includes at least one bent portion recessed toward a central plane of the device body. The elastic member is configured to provide an elastic force to drive the movable member to move toward a top end of the master-end operating device.

13 Claims, 11 Drawing Sheets

(56) References Cited

U.S. PATENT DOCUMENTS

| | | | | |
|---|---|---|---|---|
| 2020/0015917 A1* | 1/2020 | Cavalier | ................. | B25J 13/02 |
| 2020/0289228 A1* | 9/2020 | Denlinger | .............. | A61B 6/504 |
| 2020/0289229 A1* | 9/2020 | Denlinger | ................ | G06T 7/50 |
| 2021/0330407 A1* | 10/2021 | Chassot | ............ | A61B 18/1442 |
| 2024/0004369 A1* | 1/2024 | Agrawal | ............... | A61B 34/25 |

FOREIGN PATENT DOCUMENTS

| | | |
|---|---|---|
| CN | 109278061 A | 1/2019 |
| CN | 111265303 A | 6/2020 |
| CN | 211484887 U | 9/2020 |
| CN | 112775914 A | 5/2021 |
| CN | 113197673 A | 8/2021 |
| CN | 113456237 A | 10/2021 |
| CN | 217366085 U | 9/2022 |
| CN | 115486944 A | 12/2022 |
| CN | 219461395 U | 8/2023 |
| EP | 1304081 A2 | 4/2003 |
| KR | 101645969 B1 | 8/2016 |
| KR | 20170039107 A | 4/2017 |
| WO | 2013018934 A1 | 2/2013 |
| WO | 2016123785 A1 | 8/2016 |
| WO | 2022052320 A1 | 3/2022 |

OTHER PUBLICATIONS

CN First Examination Report with English Translation, CN 202310207644.7, Sep. 10, 2025, 18 pages.
Cornerstone Technology (Shenzhen) Limited, EP Search Report, EP 22913459.8, Mar. 17, 2025, 10pgs.
Cornerstone Technology (Shenzhen) Limited, CN First Examination Report with English Translation, CN 202111665845.9, Feb. 14, 2025, 13pgs.

\* cited by examiner

A-A'

MASTER-END OPERATING DEVICE AND SURGICAL ROBOT

CROSS REFERENCE TO RELATED APPLICATIONS

This application a continuation of PCT Patent Application No. PCT/CN2022/116385, entitled "MASTER-END OPERATING DEVICE AND SURGICAL ROBOT," filed Aug. 31, 2022, which claims priority to Chinese Patent Application No. CN202111665845.9, entitled "MASTER-END OPERATING DEVICE AND SURGICAL ROBOT," filed on Dec. 31, 2021, each of which is incorporated by reference herein in its entirety. This application also claims priority to Chinese Patent Application No. CN202310207644.7, entitled "DRIVING DEVICE AND SURGICAL ROBOT," filed on Feb. 24, 2023, which is incorporated by reference herein in its entirety.

TECHNICAL FIELD

The present disclosure relates to the technical field of medical devices, and in particular, to a master-end operating device and a surgical robot.

BACKGROUND

Medical and surgical micro-instruments have the advantages of accurate positioning, stable operation, high dexterity, large working range, radiation and infection protection and the like, and are widely used in various surgeries. The use of surgical micro-instruments helps to improve the precision of the surgeon's operation, solves problems of trembling, fatigue, and musculo-neurological feedback of the surgeon's hand, and enables the surgeon to perform surgical operation in the most comfortable state, which is of great value for improving the success rate of surgery and alleviating the patient's pain. In recent years, the research of surgical micro-instruments has become a new field of medical device application.

The surgeon generally operates a master hand of a master robot on the surgeon's side, and the positions and postures of the surgeon's hand and the opening and closing of the surgeon's fingers are detected and mapped, at a certain magnification ratio, to motions of a slave hand of a slave robot on the patient's side, enabling the surgeon to operate the surgical instrument with dexterity and ease.

The end of the master hand is generally configured with a three-axis gimbal to measure the posture of the hand, and a grip handle is provided at the end of the gimbal, so that the surgeon controls an angle of opening and closing of an instrument hold by the slave hand by controlling the grip handle, to achieve operations of cutting, suturing, and the like. Therefore, the grip handle is a key component for high-frequency use in robotic surgery.

The tactile feedback provided by the grip handle to the operator is critical to the operator's operational judgment. In practice, for example, when operating a clamp, a master-hand grip handle generally simulates, by some means, the sensation of a two-stage force on slave-hand clamping jaws. That is, a first stage force is existed from a position where the clamping jaws are at a maximum opening angle to a position where the clamping jaws move back to a state of nearly tight clamping, achieving the mapping control of positions of opening and closing of the slave-hand clamping jaws. Generally, at the end of a first-stage travel of the master-hand grip handle, the slave-hand clamping jaws with the mapped motions has already, or nearly, reached to a closing state, but has a relatively low output force. A second stage force is existed from a position where the clamping jaw has a slight angle in a state of nearly tight clamping to a position where the clamping jaw is in a state of full clamping, tight clamping or forceful cutting, providing the operator with the tactile sensation of tight clamping. Typically, an angle for switching between the two stage forces of the master-hand grip handle occurs when an included angle between two clamping jaws of the grip handle is within 10°, thus indicating and providing feedback to the surgeon that a tight clamping or cutting operation is being performed with a considerable output force. The angle for switching and the strength of the feedbacked the two-stage clamping forces are of great importance for physician operation, and are key points in control of the master-hand of a medical robot.

SUMMARY

A series of concepts in simplified form are introduced in the section "SUMMARY," and will be described in further detail in the section "DETAILED DESCRIPTION OF THE EMBODIMENTS". The section "SUMMARY" of the present disclosure is not intended to limit the key features and essential technical features of the technical solutions sought to be protected, let alone to being intended to determine the protection scope of the technical solutions sought to be protected.

Embodiments of a first aspect of the present disclosure provide a master-end operating device for a surgical robot. The master-end operating device includes a device body, a pair of operating mechanisms, a movable member, and an elastic member. The pair of operating mechanisms is connected to the device body, and disposed at two opposite sides of the device body respectively, and a respective operating mechanism of the pair of operating mechanisms is provided with a respective driving part. The movable member is at least partially disposed within the device body and movable in an axial direction of the device body. The movable member is provided with follower parts, a respective follower part of the follower parts is configured to interfere with the respective driving part to enable the movable member to move in the axial direction under the action of the respective operating mechanism. The respective follower part has a first constraint surface, and the first constraint surface includes at least one bent portion along a starting end to a terminal end of the first constraint surface, the at least one bent portion being recessed toward a central plane of the device body. The elastic member is configured to provide an elastic force to drive the movable member to move toward a top end of the master-end operating device.

In the master-end operating device according to the embodiments of the first aspect of the present disclosure, the structure is simple, the strength of the connecting members is high, the transition of the force can be accurately controlled, the output of the clamping force can be easily controlled, and the symmetrical movement of the pair of operating mechanisms can be easily maintained.

Embodiments of a second aspect of the present disclosure provide a surgical robot. The surgical robot includes a slave-end clamp, the master-end operating device described in the first aspect, and a control device. The control device is signally connected to the master-end operating device and the slave-end clamp.

The surgical robot according to the present disclosure has the same technical effects as those of the master-end operating device as described in the first aspect.

BRIEF DESCRIPTION OF THE DRAWINGS

The following accompanying drawings of the present disclosure are hereby used as part of the present disclosure for understanding the invention. The accompanying drawings show embodiments of the present disclosure and descriptions thereof, which are used to explain the principles of the present disclosure.

DETAILED DESCRIPTION OF THE EMBODIMENTS

Figure 1:
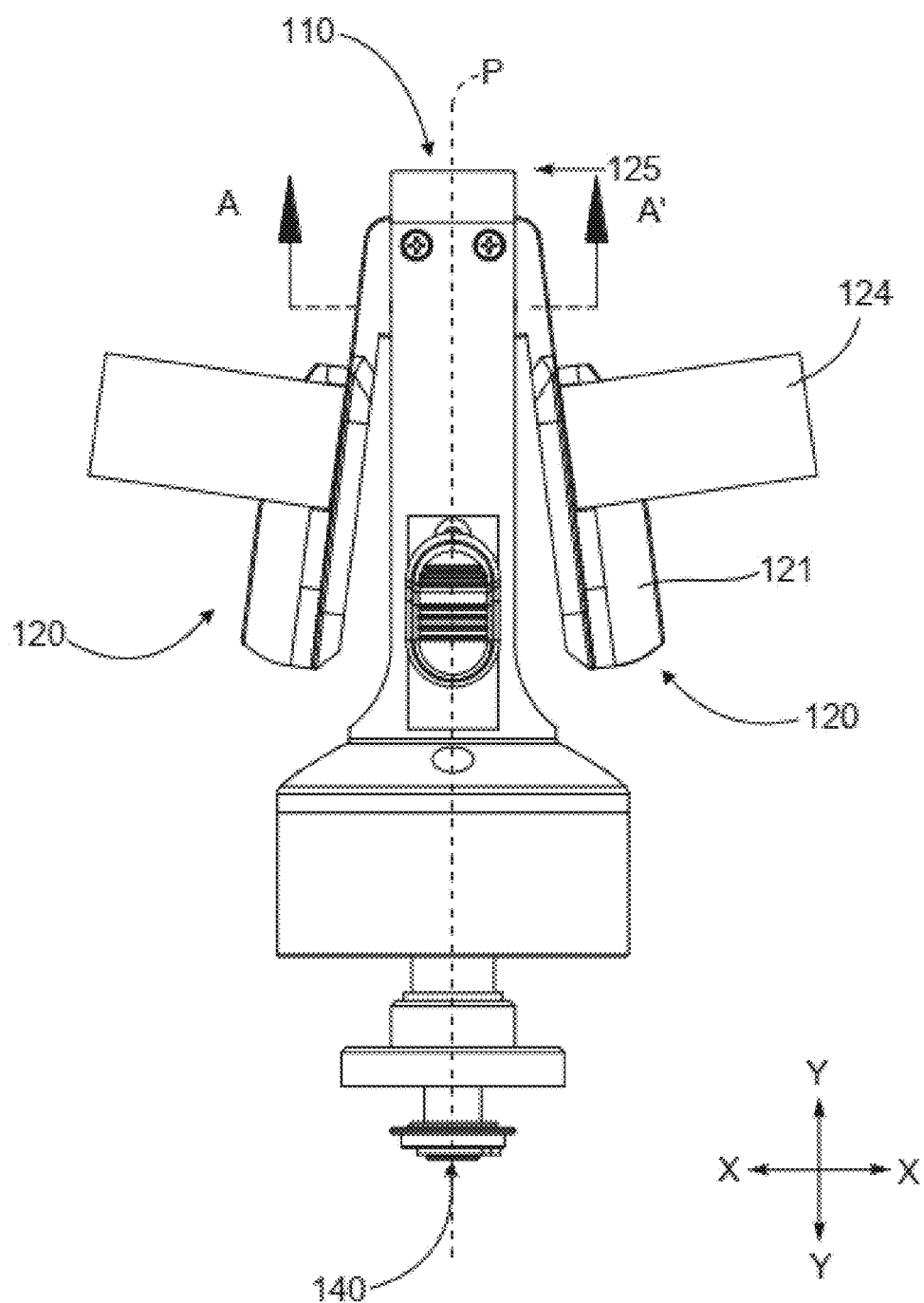
FIG. 1 is a schematic diagram illustrating a front view of a master-end operating device according to an embodiment of the present disclosure.

In the following description, many specific details are given to provide a more thorough understanding of the present disclosure. However, it would be apparent to those skilled in the art that the present disclosure may be implemented without one or more of these details. In other examples, some technical features that are well known in the art are not described to avoid confusion with the present disclosure.

For a thorough understanding of the present disclosure, the following provides a detailed description. It should be understood that these embodiments are provided to make the disclosure of the invention thorough and complete, and to adequately convey the idea of these exemplary embodiments to those skilled in the art. Apparently, the embodiments of the present disclosure are not limited in their implementation to particular details familiar to those skilled in the art. Preferred embodiments of the present disclosure are described in detail below. However, the present disclosure may also have other embodiments in addition to these detailed descriptions.

It should be noted that the terms used herein are intended only to describe specific embodiments and are not intended to limit the exemplary embodiments according to the present disclosure. As used herein, the singular form is also intended to include the plural form, unless the context clearly indicates otherwise. Furthermore, it should be further understood that the terms "includes," "including," "comprises," and/or "comprising," when used herein, specify the presence of stated features, integers, steps, operations, elements, and/or components, but do not preclude the presence or addition of one or more other features, integers, steps, operations, elements, components, and/or groups thereof.

Ordinal numbers such as "first" and "second" quoted in the present disclosure are merely identifications, and do not have any other meanings, such as a specific order. Also, for example, the term "first element" does not by itself imply the presence of "second element," nor does the term "second element" by itself imply the presence of "first element." The terms "upper," "lower," "front," "rear," "left," "right," "inner," "outer" and similar expressions used herein are for the purpose of illustration and not limitation.

At present, clamping jaws with a two-stage force mostly simulate the two-stage force by the principle of springs with different stiffness and length, and motions of two clamping jaws are coupled together by a crank connecting rod, paired meshing gears and other mechanisms to simulate symmetrical clamping. However, it is found that there are many problems with this kind of clamping jaws. For example, in a compact space, it is difficult to accurately match placement positions and compression distances of two springs with different stiffness; an angle measurement component is complex in structure and occupies a large space; a connecting rod has low strength and is subjected to an asynchronous stress; and gears are prone to meshing clearance, which leads to inaccuracy and the like. To overcome or improve at least one of the foregoing problems, the present disclosure provides a master-end operating device and a surgical robot, optionally implemented by one or more of the following embodiments.

Exemplary embodiments according to the present disclosure are described in more detail with reference to FIGS. 1 to 6.

Referring to FIGS. 1 to 4, a master-end operating device 100 of an optional embodiment of a first aspect of the present disclosure includes a device body 110, a pair of operating mechanisms 120, a movable member 1 and an elastic member 150.

The pair of operating mechanisms 120 is pivotably connected to the device body 110, and is positioned on two opposite sides of the device body 110 respectively. For example, a respective operating mechanism 120 of the pair of operating mechanisms 120 may be pivotably connected to the device body 110 through a pivot shaft 112.

The respective operating mechanism 120 is provided with a driving part. In some embodiments, the respective operating mechanism 120 includes a body 121 and a finger cuff 124 disposed on the body 121 in order to facilitate operation and avoid easy release grip of the operating mechanism 120. Exemplarily, the finger cuff 124 may be customized according to shapes of different fingers to facilitate finger insertion operations. In an optional implementation, the pair of operating mechanisms 120 is disposed symmetrically about a central plane P of the master-end operating device 100.

The movable member 1 is at least partially disposed within the device body 110, and is configured to be movable in the axial direction of the device body 110. In an optional implementation, a mounting base 160 is provided within the device body 110, and is farther away from a top end 125 of the master-end operating device 100 than the movable block 130. The elastic member 150 is connected between the movable member 1 and the mounting base 160, and is configured as a compression spring to provide an elastic force that moves the movable member 1 upward or toward the top end 125 of the master-end operating device 100.

On the premise of a small included angle between the respective operating mechanism 120 and the device body 110, a compression amount of the elastic member 150 can be set to be small, so that an output force of the spring is close to a constant value, thereby avoiding the introduction of a variation factor of the spring force to make the output force more stable.

The movable member 1 is provided with a follower part 1300 capable of interfering with the driving part. Therefore, the follower part 1300 enables the movable member 1 to move in the axial direction under the action of the driving part. In some embodiments, a pair of follower parts 1300 is also symmetrically arranged corresponding to the pair of operating mechanisms 120. A single follower part 1300 has a first constraint surface 131 having at least one bent portion 141 (shown in FIG. 5). The bent portion 141 is recessed toward the central plane P of the device body 110. The central plane P refers to a plane that bisects the device body 110 and makes the pair of operating mechanisms 120 symmetrical.

Specifically, the first constraint surface 131 includes one bent portion 141. Thus, the first constraint surface 131 is divided into a first constraint segment 132 and a second constraint segment 133 by the bent portion 141. In other words, a portion of the first constraint surface 131 from a starting end to the bent portion 141 is configured as the first constraint segment 132 described above. A portion of the first constraint surface 131 from the bent portion 141 to a terminal end is configured as the second constraint segment 133. The starting end refers to an end of the follower part 1300 away from the central plane P, and the terminal end refers to an end of the follower part 1300 proximate to the central plane P.

Thus, the bent portion 141 is configured as a corner or a bent angle of the first constraint surface 131. Specifically, the bent portion 141 is a small segment of curved surface of the first constraint surface 131.

In some embodiments, an included angle between the first constraint segment 132 and a radial cross section of the device body 110 is smaller than an included angle between the second constraint segment 133 and the radial cross section. In other words, a slope at a junction between the first constraint segment 132 and the bent portion 141 is smaller than a slope at a junction between the bent portion 141 and the second constraint segment 133 with respect to the radial cross section of the device body 110.

The junction between the first constraint segment 132 and the bent portion 141 refers to a point at a joint of the first constraint segment 132 and the bend section 141, and the junction between the bent portion 141 and the second constraint segment 133 refers to a point at a joint of the bend section 141 and the second constraint segment 133.

When the bent portion 141 is a segment of curved surface, the two junctions are two ends of the bent portion 141 respectively. When the bent portion 141 is a junction point of the bent angle, the above two junctions are at the apex of the bent angle.

In some embodiments, the first constraint segment 132 and/or the second constraint segment 133 are flat or curved surfaces. In some embodiments, the first constraint segment 132 and/or the second constraint segment 133 are curved surfaces, and each of the first constraint segment 132 and the second constraint segment 133 has a curvature less than a curvature of the bent portion 141. Exemplarily, the first constraint segment 132 and/or the second constraint segment 133 are curved surfaces with a curvature approaching zero.

The interfering motion of the driving part with the first constraint segment 132 is mapped to a state transition process of the slave-end clamp from unclamping to clamping, i.e., approaching toward clamping (but not tight clamping) from an open state. The interfering motion of the driving part with the second constraint segment 133 is mapped to a state transition process of the slave-end clamp from clamping to tight clamping.

Thus, compared with the first constraint segment 132, the second constraint segment 133 has a large included angle that makes a component of a force applied by the operating mechanism 120 to the movable member 1 in a Y direction (where the Y direction is a direction coplanar with the central plane P and perpendicular to an X direction) smaller and that makes an amount by which the movable member 1 moves in the Y direction in response to an angle of rotation of the operating mechanism 120 smaller. In this way, the movable member 1 can be moved by a relatively small distance through applying, by the operator, a greater force to the operating mechanism 120 to rotate the operating mechanism 120 by a greater angle, thereby facilitating improving the accuracy of the operation with respect to the clamping force of the slave-end clamp. In addition, there is an abrupt change in angle from the end of the first constraint segment 132 to the beginning of the second constraint segment 133, and the pressure of the spring suddenly increases, causing a sudden increase in the operation force felt by the user, so that the moving force at the slave-end clamping jaw or scissors also suddenly increases, thereby successfully completing the clamping or cutting action. In the whole process, the operator would have a two-stage force feeling which is very close to the real feeling of the hand using the clamping jaw or scissors.

In addition, when the movable member 1 moves toward the top end 125 of the master-end operating device 100 under the action of the elastic force after release grip of the operator, the follower part 1300 is able to exert an action on the driving part so that the operating mechanism 120 can be reset with the driving part.

Figure 2:
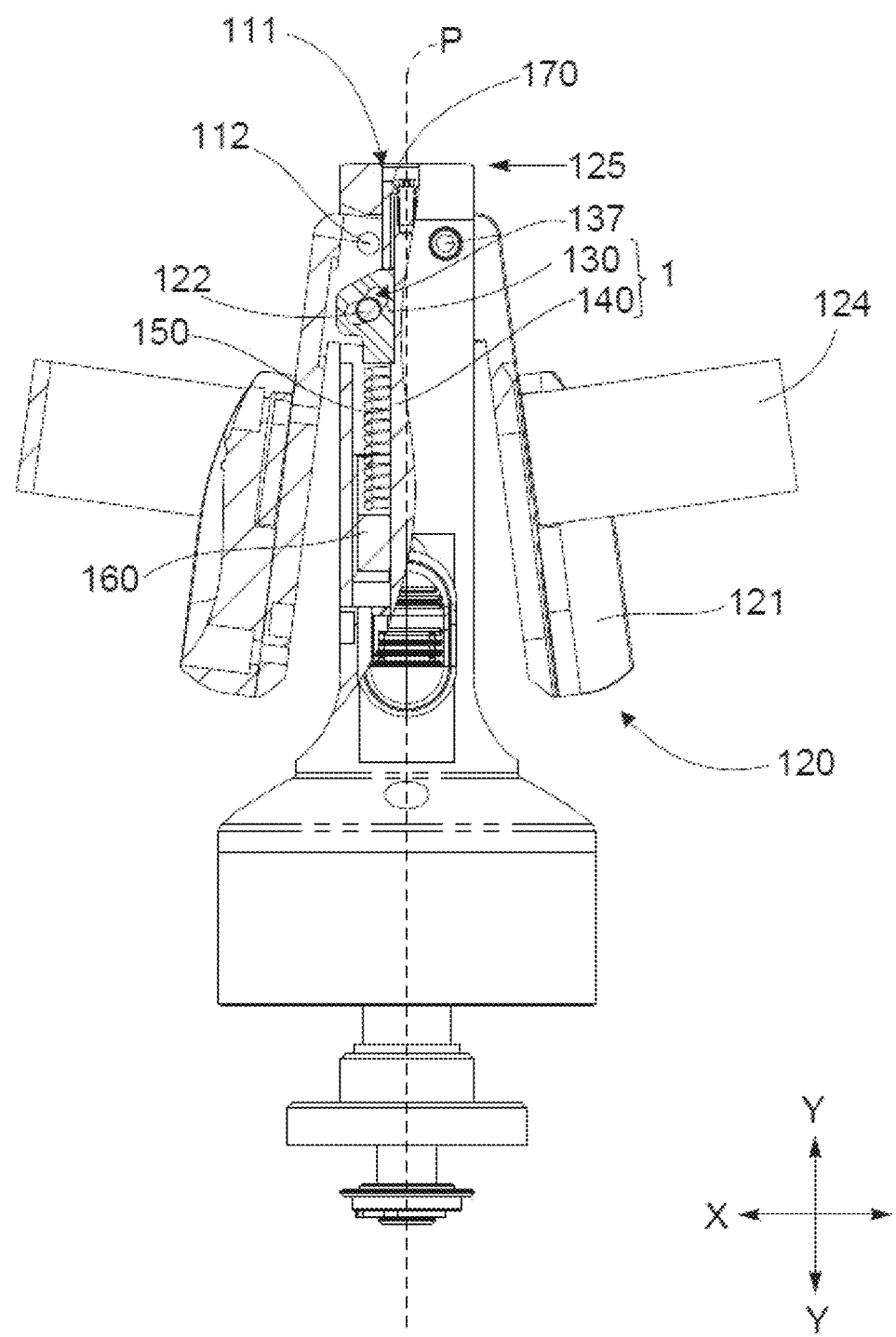
FIG. 2 is a schematic diagram illustrating a sectional view of a portion of the master-end operating device in FIG. 1.
Figure 3:
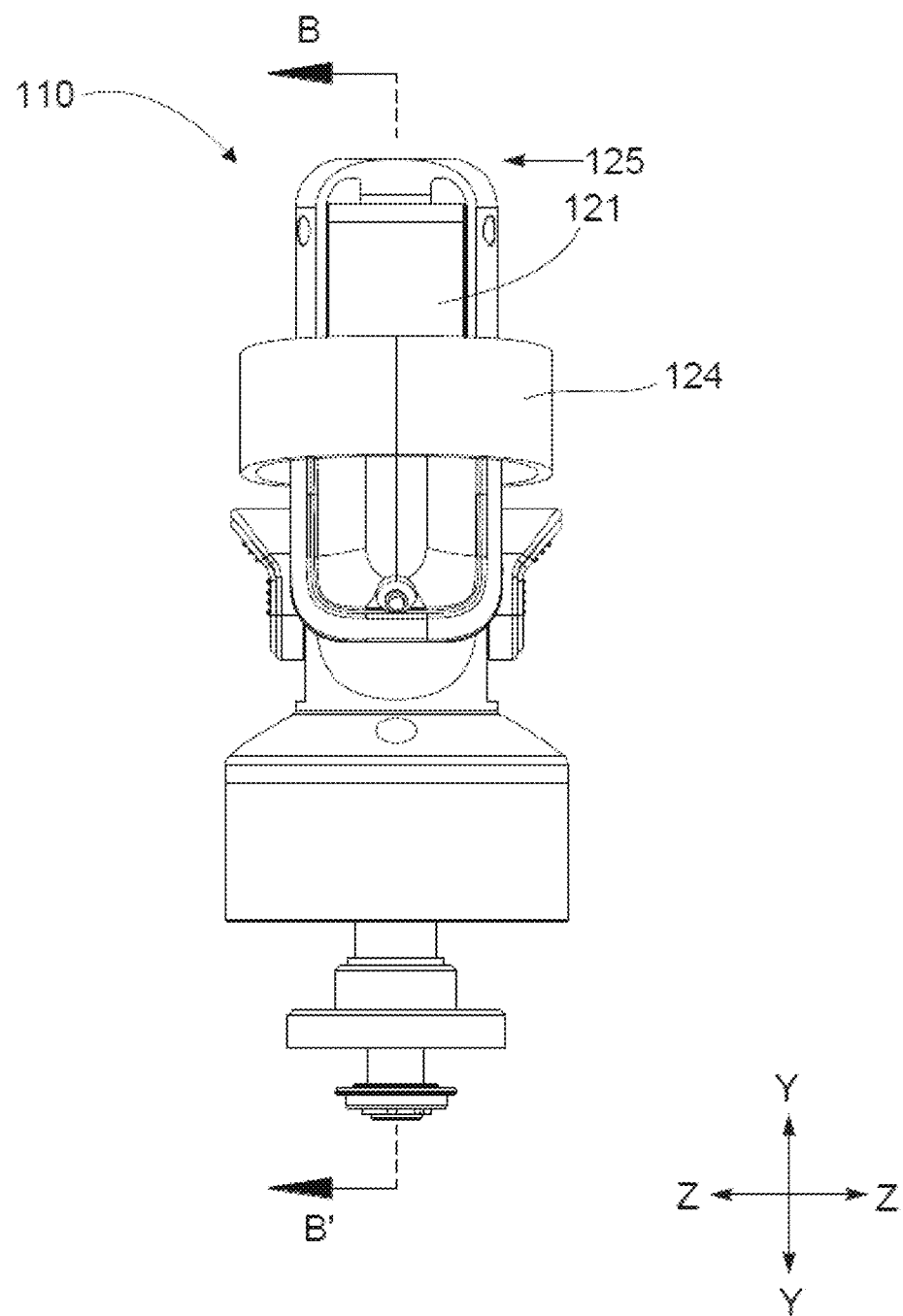
FIG. 3 is a schematic diagram illustrating a side view of the master-end operating device in FIG. 1.
Figure 4:
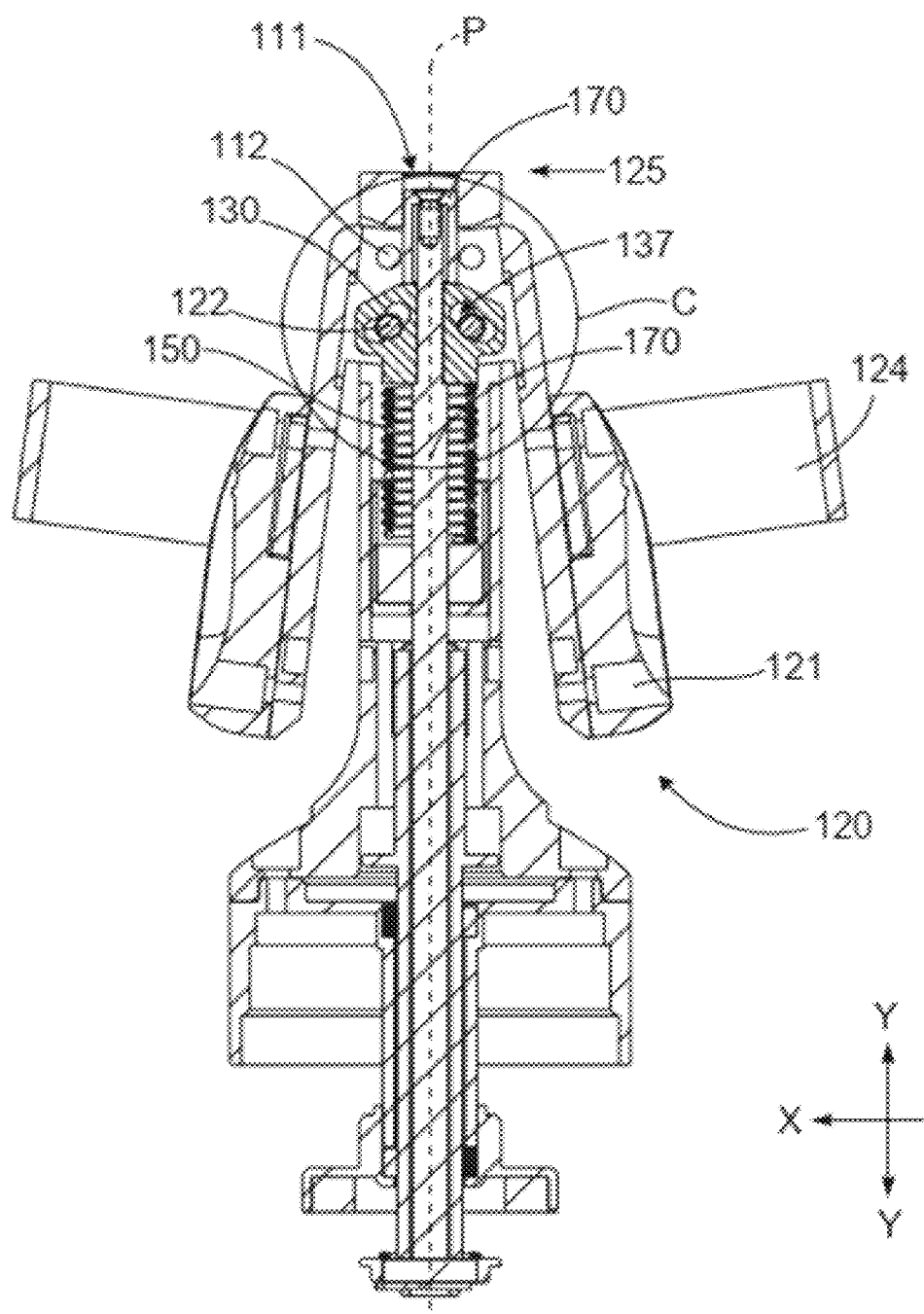
FIG. 4 is a schematic diagram illustrating a sectional view taken along line B-B' of the master-end operating device in FIG. 3.
Figure 5:
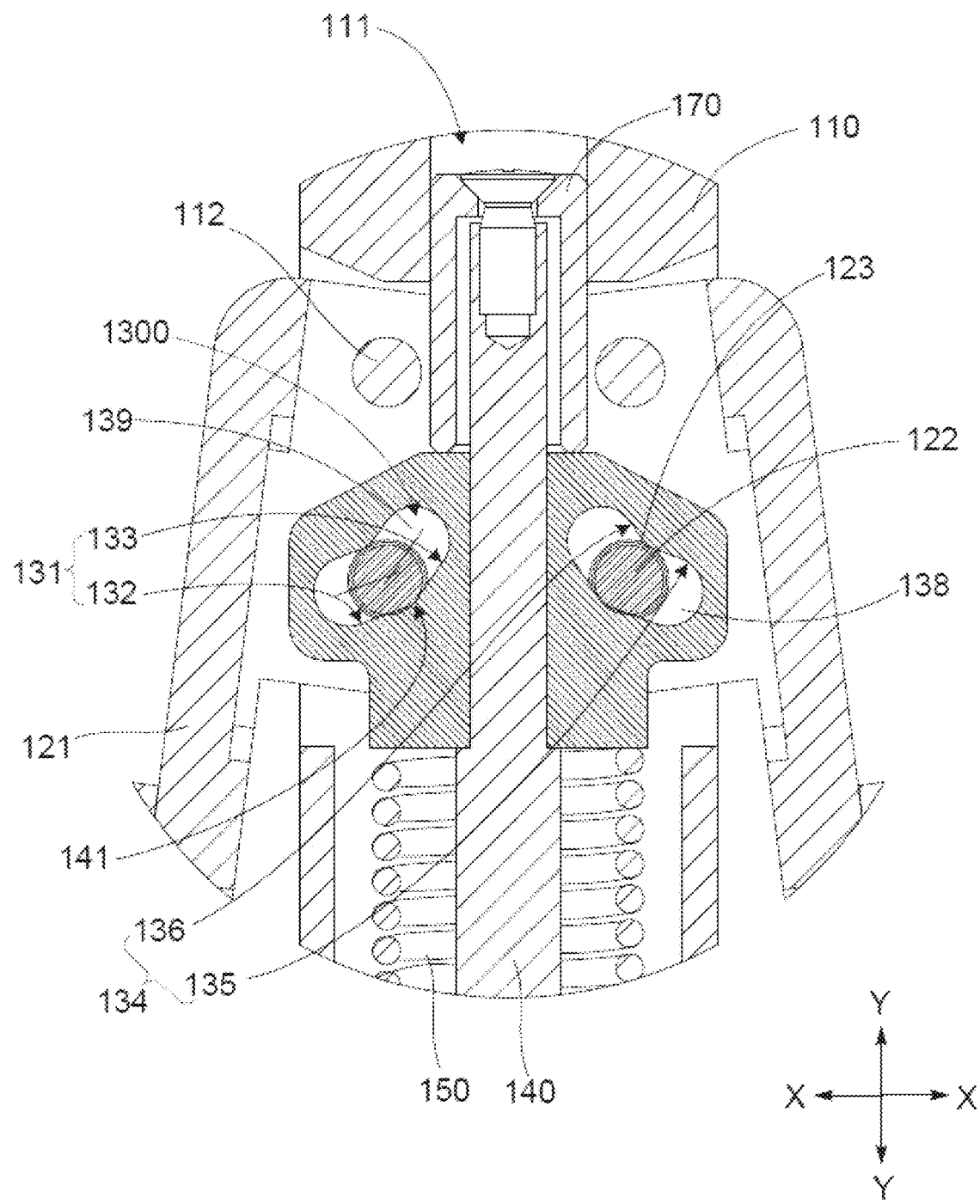
FIG. 5 is a schematic diagram illustrating an enlarged view of part C in FIG. 4.
Figure 6:
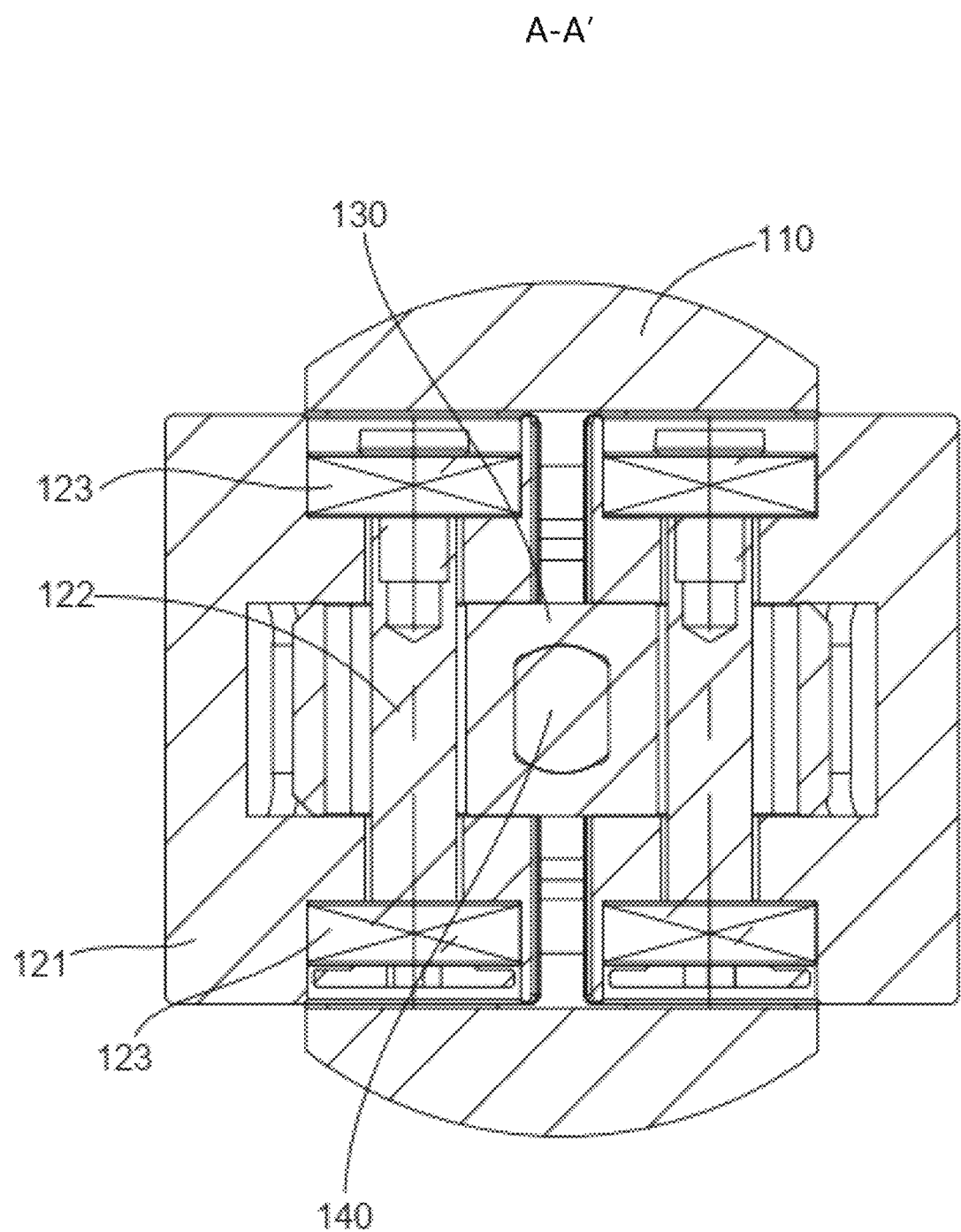
FIG. 6 is a schematic diagram illustrating a sectional view taken line A-A' of the master-end operating device in FIG. 1.
Figure 7:
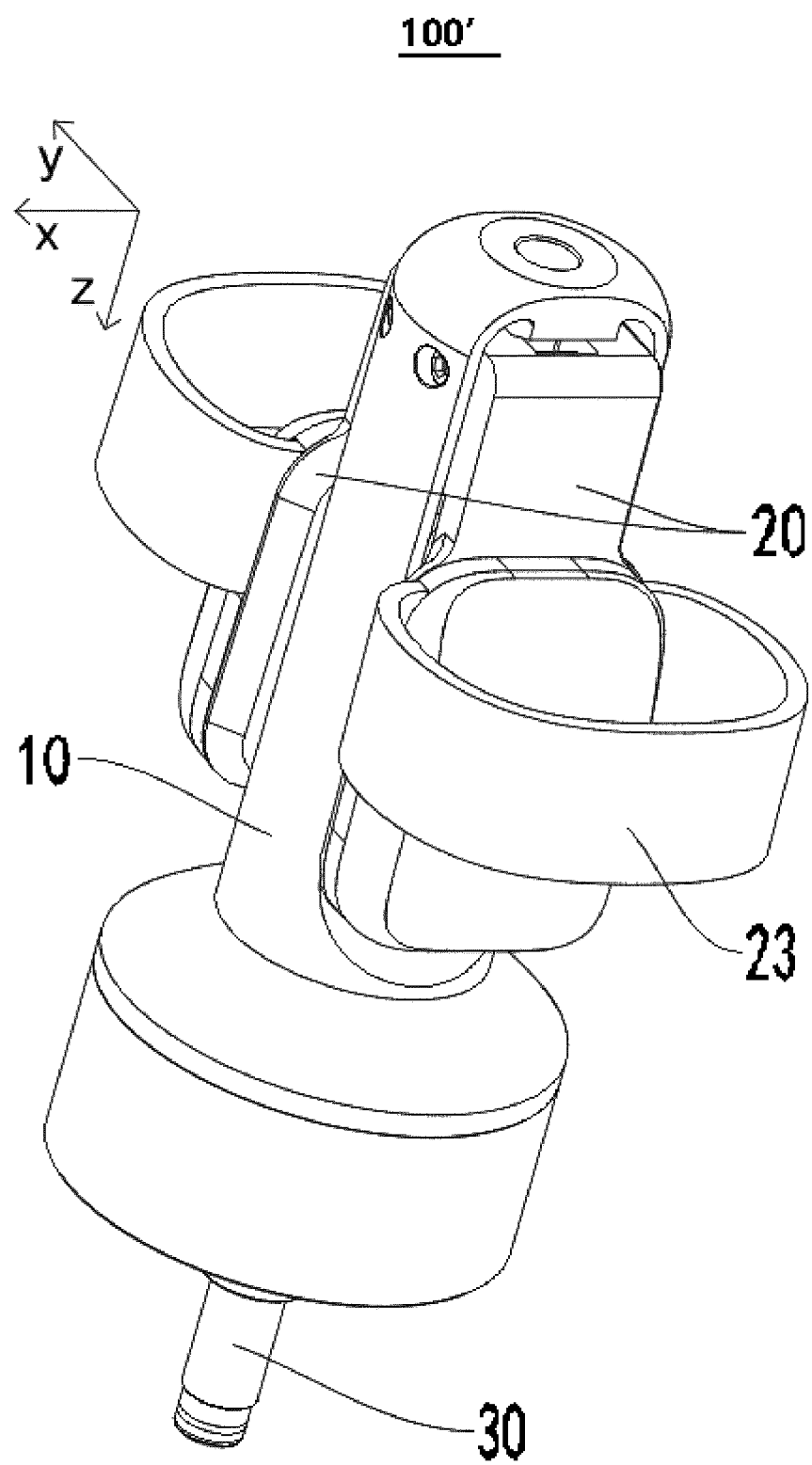
FIG. 7 is a schematic diagram illustrating a perspective view of a master-end operating device according to some embodiment of the present disclosure.
Figure 8:
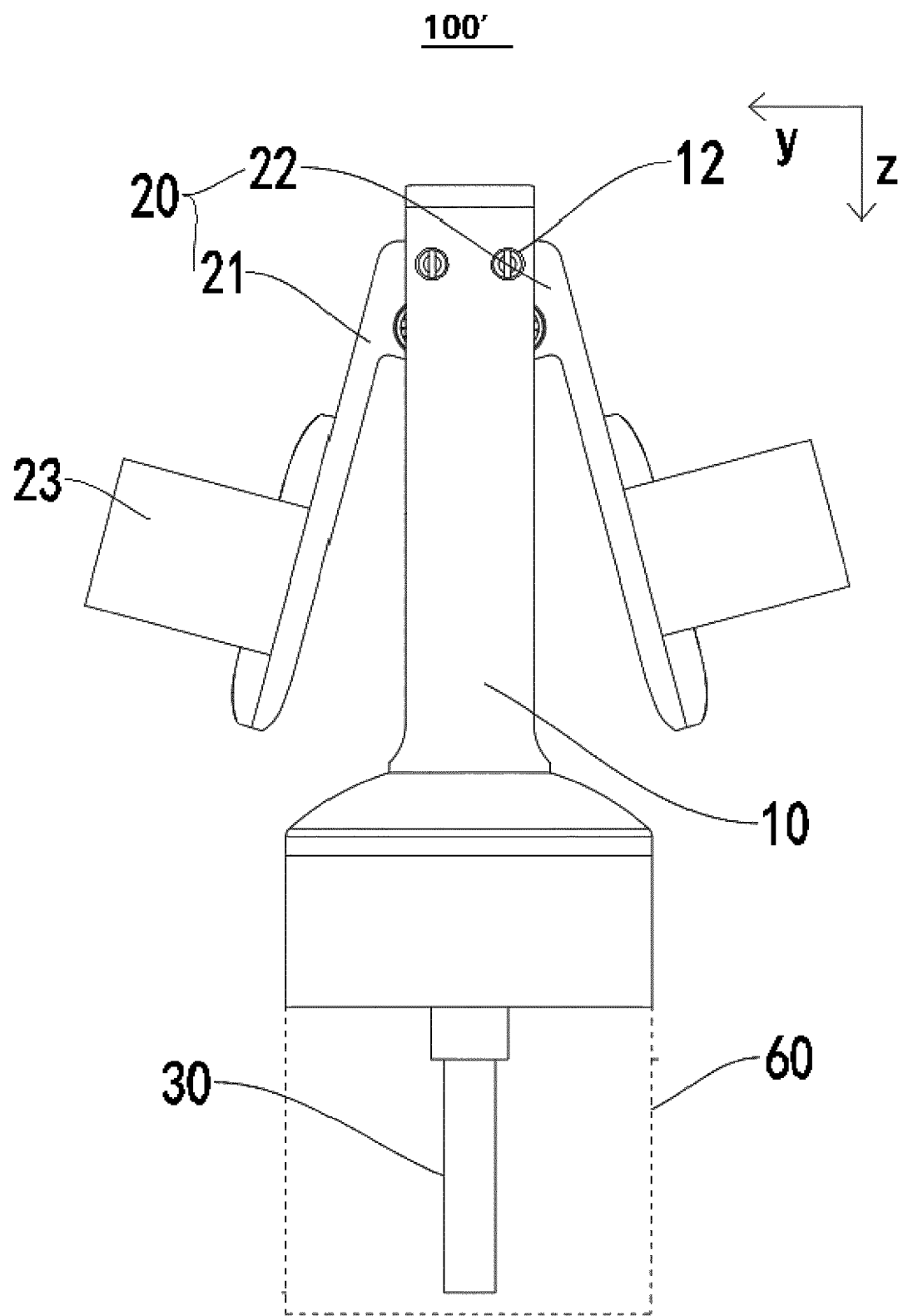
FIG. 8 is a schematic diagram illustrating a front view of a master-end operating device and an output device according to some embodiment of the present disclosure.
Figure 9:
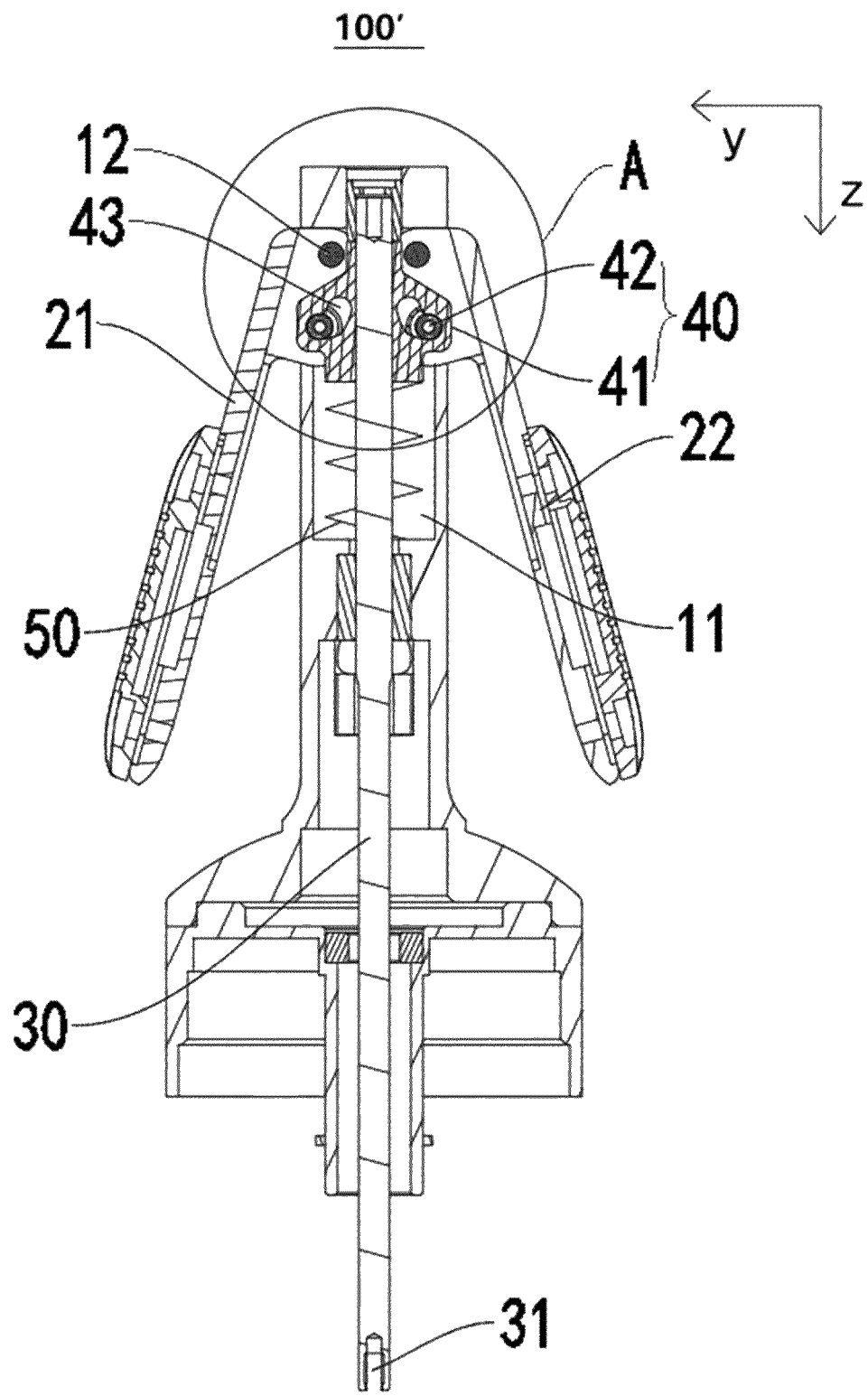
FIG. 9 is a schematic diagram illustrating a sectional view taken along a first direction of a master-end operating device according to some embodiment of the present disclosure.
Figure 10:
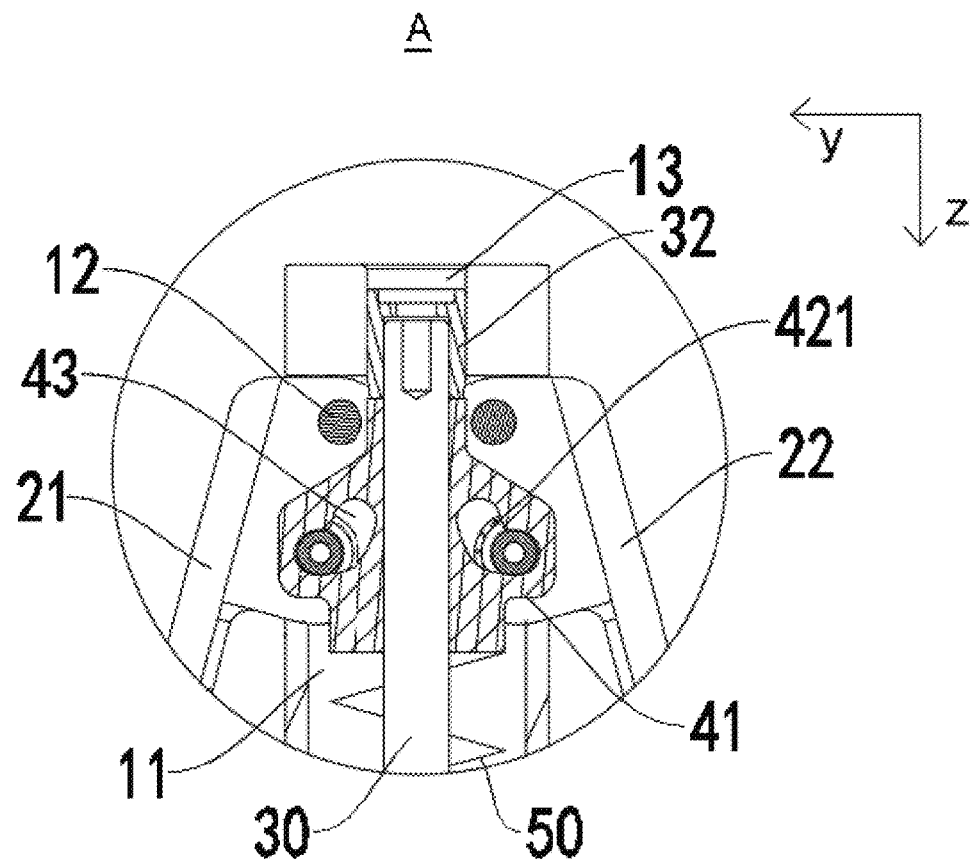
FIG. 10 is a schematic diagram illustrating an enlarged view of part A in FIG. 9.

Specifically, referring to FIGS. 2, 4 and 5, the follower part 1300 may optionally further have a second constraint surface 134. The second constraint surface 134 is spaced from the first constraint surface 131 to form, between the second constraint surface 134 and the first constraint surface 131, a space for accommodating movement of the driving part, or forming a movement groove 137. The second constraint surface 134 forms an included angle with the radial cross section. Thus, the driving part can be restricted between the first constraint surface 131 and the second constraint surface 134.

Further optionally, the second constraint surface 134 includes a third constraint segment 135 and a fourth constraint segment 136 connected to the constraint segment 135. The third constraint segment 135 corresponds to the first constraint segment 132, the fourth constraint segment 136 corresponds to the second constraint segment 133, and an included angle between the third constraint segment 135 and the radial cross section of the device body 110 is smaller than an included angle between the fourth constraint segment 136 and the radial cross section.

In some embodiments, the first constraint surface 131 and the second constraint surface 134 are arranged in parallel. That is, the first constraint segment 132 is parallel to the third constraint segment 135, and the second constraint segment 133 is parallel to the fourth constraint segment 136.

In the case of having the second constraint surface 134, the elastic member 150 may alternatively be connected between the device body 110 and the operating mechanism 120 to provide an elastic force that allows the operating mechanism 120 to be reset. Thus, the driving part can interact with the second constraint surface 134 upon the release grip of the operator, thereby driving the movable member 1 to move in a direction toward the top end 125 of the device body 110.

Referring further to FIGS. 4 and 5, the driving part includes a driving shaft 122 disposed between the first constraint surface 131 and the second constraint surface 134. Each of two ends of the driving shaft 122 is provided with a bearing 123, for example, a deep groove ball bearing. An outer ring of the bearing 123 is connected to the body 121, and an inner ring of the bearing 123 is connected to the driving shaft 122. In this way, when the driving shaft 122 of the driving part moves along the first constraint surface 131, contact friction can be reduced, and even sliding friction can be completely changed into rolling friction, thereby facilitating smooth operation.

A portion of the movement groove 137 between the first constraint segment 132 and the third constraint segment 135 forms a first movement segment 138, and a portion of the movement groove 137 between the second constraint segment 133 and the fourth constraint segment 136 forms a second movement segment 139. When the driving shaft 122 is located at the first movement segment 138, the slave-end clamp is in a clamping state, or, in a state transition process from unclamping to clamping. When the driving shaft 122 is located at the second movement segment 139, the slave-end clamp is in a tight clamping state, or, in a state transition process from clamping to tight clamping.

A distance between the first constraint surface 131 and the second constraint surface 134 is In some embodiments compatible with a diameter of the driving shaft 122. For example, the distance between the first constraint surface 131 and the second constraint surface 134 may be equal to, or slightly greater than, the diameter of the driving shaft 122. Thus, the driving shaft 122 can be better restricted to move within the first movement segment 138 and the second movement segment 139.

The movable member 1 includes a movable block 130 and a movable rod 140. The movable block 130 is disposed in the device body 110, and has an outer circumference restricted by the inner circumference of the device body 110, so that the movable block 130 can only move in the axial direction. The follower part 1300 is provided on the movable block 130. In the illustrated implementation, the follower part 1300 is configured as a groove provided on the movable block 130, such as a splayed groove which is symmetrically arranged.

The movable rod penetrates the movable block 130, a top end of the movable rod extends to the top of the device body 110, and a bottom end of the movable rod extends out of the device body 110 to be configured for connection with a slave-end clamp or a control device. The top of the device body 110 is provided with a through hole 111, and the movable rod extends into the through hole 111. The top of the device body 110 is further provided with a positioning sleeve 170 which extends into the through hole 111 and is sleeved on the movable rod 140. An outer circumference of the positioning sleeve 170 is restricted by an inner circumference of the through hole 111, so that the position of the movable rod 140 is also restricted, improving the stability of the movable restricted 140 in the Y direction, and the movable rod 140 can move up and down stably. Moreover, such configuration also improves the strength of the movable part.

According to the master-end operating device 100 of the present disclosure, the structure is simple, the strength of the connecting members is high, the transition of the force can be accurately controlled, the output of the clamping force can be easily controlled, and the symmetrical movement of the pair of operating mechanisms 120 can be easily maintained.

A master-end operating device of another optional embodiment of the first aspect of the present disclosure is described below in connection with the accompanying drawings. In this description, an x direction in the accompanying drawings is a second direction, a y direction is a third direction, and a z direction is a first direction. In the accompanying drawings, the dimensions in the drawings are not necessarily proportional to the actual dimensions for the convenience of drawing.

As shown in FIGS. 7 to 11, another optional embodiment of the present disclosure provides a master-end operating device 100' for connecting an output device and driving a slave-end clamp of a surgical robot. The master-end operating device 100' includes a main body 10, rotating members 20, a movable rod 30, a drive assembly 40, and an elastic member 50.

One end of the main body 10 is connected to the output device 60. The main body 10 is provided with a hollow cavity 11. The rotating members 20 are connected to the main body 10 and are capable of being deflected relative to the main body 10. The movable rod 30 is disposed in the hollow cavity 11, and is movable relative to the main body 10, in the first direction z, which is parallel to a length direction of the movable rod 30. The drive assembly 40 includes driving blocks 41 and driving shafts 42. The driving blocks 41 are fixedly connected to the movable rod 30, and an end portion of a respective driving shaft 42 along the second direction x is connected to a respective rotating member 20. A single driving block 41 is provided with a driving groove 43, the respective driving shaft 42 is at least partially disposed in the driving groove 43, the second direction x is parallel to an axial direction of the respective driving shaft 42, and the elastic member 50 is configured to provide a force for the movable rod 30 to make the movable rod 30 have movement tendency toward a side away from the output device 60.

Herein, in a plane perpendicular to the second direction x, i.e., the yz plane, a projection of the driving groove 43 near a side of the movable rod 30 is a first edge 434. In the first direction z toward the output device 60, a vertical distance between the first edge 434 and the movable rod 30 gradually increases, i.e., the distance in the third direction y gradually increases. A portion of the first edge 434 that is able to be tangent with the driving shaft 42 and furthest away from the movable rod 30 in the vertical distance is a starting position 431. When the driving shaft 42 contacts the starting position 431, it can be regarded as a line contact in the second direction x. At the starting position 431, there is a force applied on the driving shaft 42 to make the driving shaft 42 move away from the movable rod 30 along the first edge 434. When the rotating member 20 deflects, in the deflection plane of the rotating member 20, that is, in the yz plane, to drive the driving shaft 42 away from the movable rod 30, the rotating member 20 is able to obtain a feedback force.

The main body 10 refers to a frame portion of the main body on the master-end operating device 100'. For example, the main body 10 may be configured to form a hollow cavity 11, which may be configured to accommodate the movable rod 30 as well as other components. The main body 10 may be in a variety of structural forms, such as rectangular, cylindrical, and the like.

The rotating member 20 refers to a component that is capable of rotating relative to the main body 10, for example, the rotating member 20 is hinged to the main body 10.

The movable rod 30 refers to a component for coupling to the output device 60. The movable rod 30 has a length with a length direction parallel to the first direction z. The movable rod 30 is capable of moving in the first direction z with respect to the main body 10. The movable rod 30 includes a portion disposed within the main body 10 and another portion connected to the output device 60. In some embodiments, the movable rod 30 has a first end disposed within the main body 10, and a second end 31 connected to the output device 60, i.e., the first end is located further away from the output device 60 with respect to the second end 31.

The output device 60 refers to a component that is coupled to the master-end operating device 100' and is capable of controlling the surgical robot based on the output of the master-end operating device 100'. For example, the output device 60 may be a component coupled to the movable rod 30 and capable of measuring the force output by the movable rod 30, such as a sensing component, or the like. Exemplarily, the output device 60 is capable of measuring a distance moved by the movable rod 30 and a rotation angle of the corresponding rotating member 20, and processing this data information to send a corresponding command to the slave-end clamp, so as to cause the slave-end clamp to perform a surgical operation in accordance with the command.

By obtaining a feedback force when the rotating member 20 is caused to deflect to drive the driving shaft 42 away from the starting position 431, it is possible to effectively reduce the degree of sensitivity of the rotating member 20 to the internal clearance of the master-end operating device 100' when used by an operator, to improve the problem of false position, and to improve the working accuracy of the surgical robot.

In some embodiments, the driving groove 43 is of curved or straight shape.

In some embodiments, the driving groove 43 is a through hole or a blind hole extending along the second direction x.

In some embodiments, the driving block 41 is integrally formed with the movable rod 30 or is separately formed from the movable rod 30. It should be understood that when the driving block 41 is separately formed from the movable rod 30, the driving block 41 may be coupled to the movable rod 30 by welding, gluing, or the like. In a preferred embodiment of the present disclosure, the driving block 41 may be socketed to the movable rod 30.

In some embodiments, the elastic member 50 is provided as a spring. One end of the elastic member 50 abuts against the movable rod 30 and the other end of the elastic member 50 abuts against the main body 10, so as to provide elasticity for the movable rod 30 to cause the movable rod 30 to move toward a side away from the second end 31. Exemplarily, the movable rod 30 is fixedly connected to the driving block 41, and one end of the elastic member 50 abuts against the main body 10 and the other end of the elastic member 50 abuts against the driving block 41.

In some embodiments, the driving block 41 is disposed within the hollow cavity 11 and is circumferentially restricted by sidewall of the hollow cavity 11 such that the driving block 41 can only move in the axial direction of the movable rod 30.

It should be understood that an included angle between a tangent line at the starting position 431 and the third direction y is set in a range having a reasonable upper limit depending on a range of the force input by the operator, e.g., it may be 15°, 20°, 25°, 30°, 35°, or 40°, and so on.

When in use, the operator applies force to the rotating members 20 to make the rotating members 20 rotate, and the rotating members 20 rotates to drive the driving shaft 42 to move. Due to the driving shaft 42 being threaded inside the driving groove 43, the driving shaft 42 interferes with the driving groove 43 when rotating and the driving groove 43 is subjected to the partial force in the first direction z, so as to drive the driving block 41 to move, and the driving block 41 is connected with the movable rod 30, to drive the movable rod 30 to move and compress the elastic member, so that the force applied by the operator through the rotating members 20.

In some optional embodiments of the present disclosure, an included angle $\alpha$ between the tangent line of the first edge 434 at the starting position 431 and the third direction y satisfies: $\alpha \geq 10°$, and the third direction y is perpendicular to the second direction x and the first direction z.

By limiting the range of the included angle between the tangent line at the starting position 431 on the driving groove 43 and the third direction y, the degree of inclination at the starting position 431 can be restricted on a suitable lower limit, so that a certain degree of feedback force is fed back to the operator at the starting position 431 when in use, and the feedback force in turn reduces the degree of sensitivity of the rotating member 20 to the clearance within the master-end operating device 100'.

Figure 11:
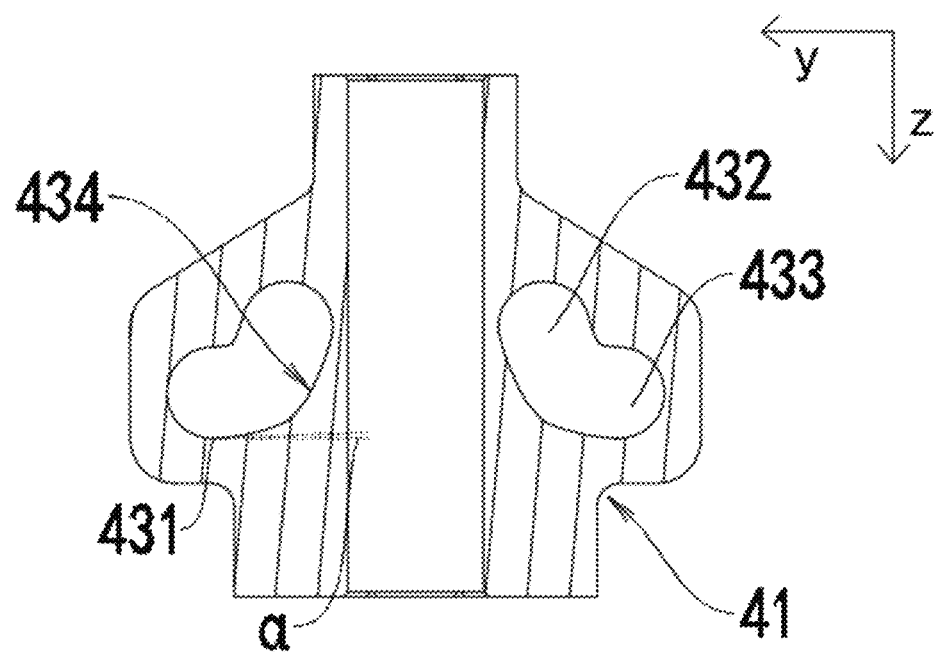
FIG. 11 is a schematic diagram illustrating a structure of a driving block according to some embodiment of the present disclosure.

As shown in FIG. 11, in some optional embodiments of the present disclosure, the included angle $\alpha$ between the tangent line of the first edge 434 at the starting position 431 and the third direction y satisfies: $10° \leq \alpha \leq 20°$.

By limiting the range of the included angle between the tangent line at the starting position 431 on the driving groove 43 and the third direction y, on the one hand, a suitable upper limit exists for the degree of inclination at the starting position 431, on the one hand, design space is reserved for the design of the length of the driving groove 43, and furthermore, for the design space of the other components of the device.

In some embodiments, the included angle $\alpha$ between the tangent line of the first edge 434 at the starting position 431 and the third direction y satisfies: $11° \leq \alpha \leq 19°$, $12° \leq \alpha \leq 18°$, $13° \leq \alpha \leq 17°$, $14° \leq \alpha \leq 16°$, or $14° \leq \alpha \leq 15°$.

As shown in FIGS. 7 to 11, in some optional embodiments of the present disclosure, the driving groove 43 includes a first portion 433 and a second portion 432 disposed consecutively. The first portion 433 is disposed on a side of the second portion 432 proximate to the second end 31, and a slope of a line connecting two points spaced in a unit distance apart at any point on the first portion 433 is less than a slope of a line connecting two points spaced in a unit distance apart at any point on the second portion 432.

The first portion 433 and the second portion 432 being provided consecutively means that the first portion 433 is coupled to the second portion 432, and that the driving shaft 42 is able to smoothly move from the first portion 433 to the second portion 432 as the driving shaft 42 moves within the driving groove 43.

Two points spaced in a unit distance apart means, two points spaced in a unit distance apart along an inner wall of the driving groove 43, and exemplarily, two points spaced in a unit distance apart may be, two points spaced in a unit distance apart on the first edge 434.

It should be understood that the unit distance is not fixed at a particular value and serves to provide uniformity to reflect a difference in the amount of slope change between the first portion 433 and the second portion 432, such that the trend in the slope change of the unit distance on the first portion 433 is less than the trend in the slope change of the unit distance on the second portion 432.

By setting the slope of the line connecting two points at any interval unit distance on the first portion 433 be smaller than the slope of the line connecting two points at any interval unit distance on the second portion 432, on one hand, it is possible to make the change of the force fed back to the rotating members 20, and on the second portion 432, the feedback force acting on the rotating members 20 significantly increases, so that the operator exerts a larger force on the rotating members 20, so as to make the movable rod 30 move the corresponding distance, effectively improving the working precision of the surgical robot. On the other hand, the change of the aforementioned feedback force is also closer to the actual surgical process, so that the operator's experience is significantly enhanced, facilitating the conduct of surgical work. Taking cutting as an example, the actual cutting process usually includes a clamping stage and a cutting stage. In the clamping stage, the operator only needs to clamp, so the applied force is smaller, and the feedback force received is also smaller. While in the cutting phase, the operator applies a larger force and receives a larger feedback force.

In some embodiments, the driving groove 43 further includes a third portion. The first portion 433 and the second portion 432 are connected by the third portion, the third portion is configured to make transition between the first portion 433 and the second portion 432 smoother, facilitating the movement of the driving shaft 42 between the first portion 433 and the second portion 432. Exemplarily, the third portion may be a rounded structure disposed between the first portion 433 and the second portion 432.

In some optional embodiments of the present disclosure, the driving shaft 42 is in rolling contact with the first edge 434.

The driving shaft 42 in rolling contact with the first edge 434 means that rolling friction occurs between the driving shaft 42 and the first edge 434 as the driving shaft 42 is moved relative to the first edge 434. Exemplarily, the driving shaft 42 may be provided with a roller structure and contacted with the first edge 434 by the roller structure, which rolls as the driving shaft 42 is moved relative to the first edge 434.

By causing the driving shaft 42 to be in rolling contact with the first edge 434, the driving shaft 42 can be made to rotate in its axial direction, so that when the driving shaft 42 interferes with the driving groove 43, the sliding friction between the two is transformed into rolling friction, which significantly reduces friction coefficient of the driving shaft 42 and the driving groove 43, improves the experience of the use of the master-end operating device, and prolongs the service life of the driving shaft 42 and the driving groove 43.

Figure 12:
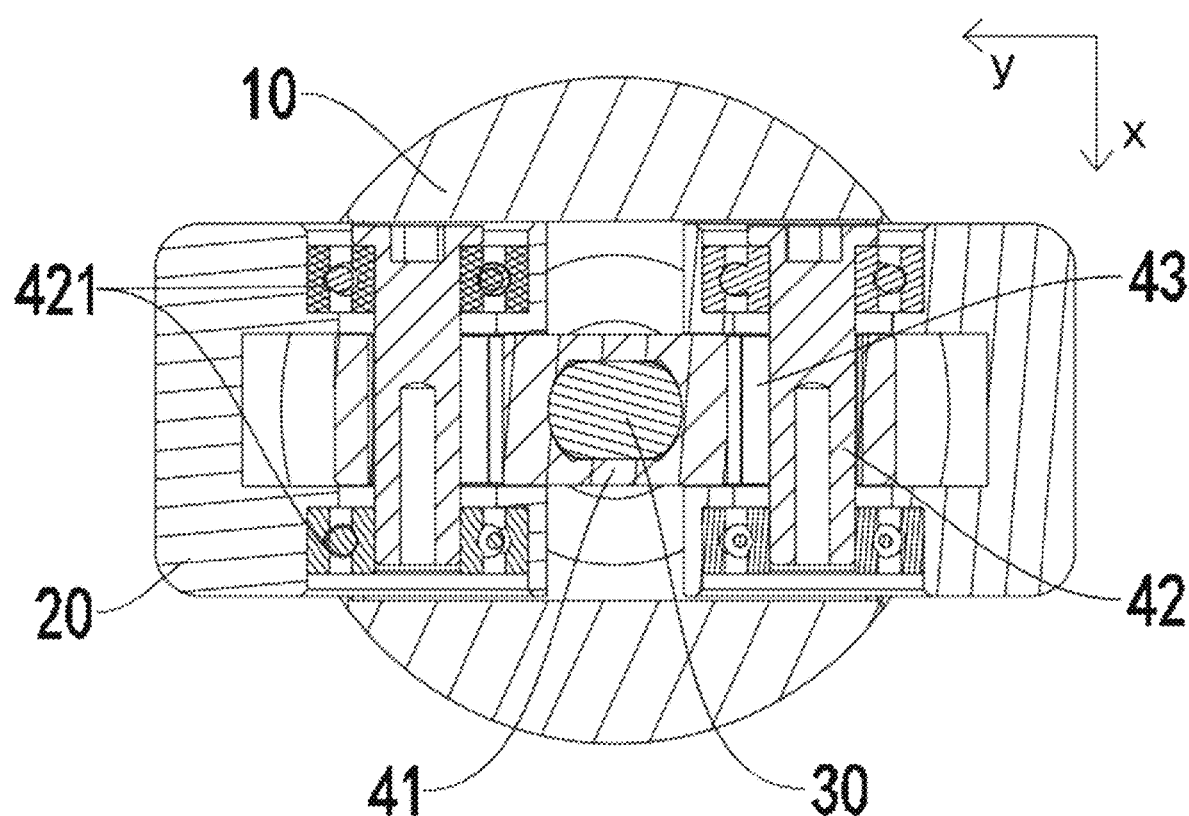
FIG. 12 is a schematic diagram illustrating a sectional view taken along an axial direction of a driving shaft of a master-end operating device according to some embodiment of the present disclosure.

FIG. 12 shows a schematic diagram illustrating a cross-sectional structure taken along an axial direction of a driving shaft of a master-end operating device in some embodiments of the present disclosure.

As shown in FIGS. 8 to 12, in some optional embodiments of the present disclosure, the driving shaft 42 is coupled with a bearing 421, the bearing 421 is provided at an end of the driving shaft 42, and the driving shaft 42 is rotationally coupled to the rotating member 20 via the bearing 421.

By providing the bearing 421, it is possible to make the driving shaft 42 rotate around its axial direction, to realize rolling friction between the driving shaft 42 and the driving groove 43, and to make the structure at the driving shaft 42 more compact and reduce the complexity of the master-end operating device.

In some embodiments, the bearing 421 may be realized by a shaft sleeve.

In some embodiments, two opposite sides of the driving shaft 42 may be coupled to the rotating members 20 respectively, so two bearings 421 may be provided at two ends of the driving shaft 42, and two ends of the driving shaft 42 is rotationally coupled to the rotating members 20 via a respective bearing 421 of the two bearings 421, respectively.

In some embodiments, the bearing 421 may be a deep groove ball bearing. In this case, the outer ring of the bearing 421 is coupled to the rotating member 20 and the inner ring of the bearing 421 is coupled to the shaft 422.

In some optional embodiments of the present disclosure, as shown in FIGS. 7 to 11, a constraining groove 13 is provided on the main body 10 on a side of the main body away from the second end 31, and extends along the first direction z toward the side away from the second end 31. At least a portion of the movable rod 30 is positioned in the constraining groove 13 and fits with the constraining groove 13 in a restricted manner.

By providing the constraining groove 13 and causing the movable rod 30 to fit into the constraining grooves 13 in a restricted manner, radial movement of the movable rod 30 can be reduced and the precision of the movement of the movable rod 30 along its axial direction can be improved.

In some embodiments, the movable rod 30 may also be provided with an end cap 32. The end cap 32 is disposed on the movable rod 30 at an end of the movable rod 30 away from the second end 31. The end cap 32 is disposed within the constraining groove 13 and fits with the constraining groove 13 in a restricted manner. Exemplarily, at least a portion of the end cap 32 on the movable rod 30 is within the constraining groove 13 throughout movement of the movable rod 30.

As shown in FIGS. 7 to 11, in some optional embodiments of the present disclosure, the rotating members 20 include a first handle 21 and a second handle 22 respectively. The first handle 21 and the second handle 22 are disposed on two opposite sides of the main body 10, and are capable of symmetrically deflecting with respect to the main body 10 in a plane that is perpendicular to the second direction x. Two driving grooves 43 and two driving shafts 42 are provided, the two driving grooves 43 are symmetrically provided with respect to the movable rod 30, the two driving shafts 42 are movable within the two driving grooves 43 respectively, and the two driving shafts 42 correspond to the first handle 21 and the second handle 22 respectively.

By setting the first turn handle 21 and the second turn handle 22, it is easy to simulate the actual surgical operation and improve precision of the surgical operation.

In some embodiments, with the elastic member 50 in an energy-released state, the elastic member 50 holds the driving block 41 against the furthest position away from the second end 31. At this time, there is a maximum included angle between the first handle 21 and the second handle 22 and the driving shaft 42 is located at the start position 431 within the driving groove 43.

When in use, an operator exerts a force on the first handle 21 and the second handle 22, the first handle 21 and the second handle 22 rotate toward the movable rod 30, drive the driving shafts 42 to move from the starting positions 431. The force borne by the first handle 21 and the second handle 22 increases uniformly within the first portion 433. When the driving shaft 42 is transition to the second portion 432, a larger included angle of the second portion 432 causes the partial force on the driving shaft 42 along the axial direction of the movable rod 30 to decrease, and the amount of movement of the movable rod 30 along its axial direction following the rotation angle of the rotating members 20 also decreases, so that the transition from the first portion 433 to the second portion 432 causes a large jump in the force borne by the first handle 21 and the second handle 22, to match the actual operation process. Throughout the process, the operator has a two-stage force feeling that is very close to that of the feeling of the real state of the hand using clamp or scissors.

In some embodiments, the driving shaft 42 moving within the first portion 433 is mapped to a state transition process of the slave-end clamp from unclamping to clamping, and the driving shaft 42 moving within the second portion 432 is mapped to a state transition process of the slave-end clamp from clamping to tight clamping.

Exemplarily, two driving groove 43 are provided and may be a splayed groove which is symmetrically arranged.

As shown in FIGS. 7 to 11, in some optional embodiments of the present disclosure, the first handle 21 and the second handle 22 are disposed symmetrically on two opposite sides of the main body 10 with the movable rod 30 as an axis. By enabling the first handle 21 and the second handle 22 to be disposed symmetrically on two opposite sides of the main body 10 with the movable rod 30 as an axis, it is possible to enable an operator to apply a force on the first handle 21 and the second handle 22 and receive a feedback force from the first handle 21 and the second handle 22 when using the first handle 21 and the second handle 22, which not only improves the symmetry of the movement of the rotating members 20, but also facilitates the operation of exchanging fingers to hold the two handles.

Exemplarily, the first handle 21 and the second handle 22 are disposed axially symmetrical to the center line of the movable rod 30.

In some optional embodiments of the present disclosure, the rotating member 20 further includes a finger cuff 23. By providing the finger cuff 23, it is easy for an operator to connect with the rotating members 20, so that it is difficult for easy release grip of the rotating members 20.

Exemplarily, the finger cuff 23 may be customized according to shapes of different fingers to facilitate finger insertion operations.

As shown in FIGS. 7 to 11, in some optional embodiments of the present disclosure, the main body 10 further includes a mounting base, and the elastic member 50 is disposed between the mounting base and the driving block 41.

By providing the mounting base, one end of the elastic member 50 is able to abut against the main body 10 and the other end of the elastic member 50 is able to abut against the driving block 41, so that it is convenient to provide a force for the movable rod 30 to move toward the side away from the second end 31.

It should be understood that the elastic member 50 may also be coupled between the main body 10 and the driving block 41 to provide an elastic force that causes the movable rod 30 to reset. When the operator releases the handle, the elastic member 50 releases the elastic potential energy and pushes the driving block 41 towards the side away from the second end 31, and the movement of the driving block 41 brings the driving groove 43 to move, which in turn interferes with the driving shaft 42 to drive the driving shaft 42 to move, so as to drive the rotating members 20 to reset.

It is worth noting that, in the embodiments shown in FIGS. 1 to 6 and the embodiments shown in FIGS. 7 to 12, similar elements may employ different terminology and different reference signs, for example, the device body 110 and the main body 10, the operating mechanism 120 and the rotating member 20, the pivot shaft 112 and the rotating shaft 12, the movement groove 137 and the driving groove 43, the movable block 130 and the driving block 41, driving shaft 122 and 42, first movement segment 138 and first portion 433, second movement segment 139 and second portion 432, first constraint surface 131 and first edge 434, starting end and starting position 431, through hole 111 and constraining groove 13, positioning sleeve 170 and end cap 32, but with similar positions and functions, respectively, and the respective details of the embodiments can be implemented in conjunction with each other without conflict.

Embodiments of a second aspect of the present disclosure provide a surgical robot. The surgical robot includes a slave-end clamp, a master-end operating device in any embodiment of the first aspect of the present disclosure and a control device. The control device is signally connected to the master-end operating device and the slave-end clamp.

In one example, the control device is configured to control the slave-end clamp to gradually transition from an open state to a clamping state when the driving part interferes with the first constraint segment 132 and moves in a direction toward the second constraint segment 133, to transition into the clamping state when the driving part is located at a joint of the first constraint segment 132 and the second constraint segment 133, and control a clamping force of the slave-end clamp to gradually increase when the driving part interferes with the second constraint segment 133 and moves in a direction away from the first constraint segment 132.

In one example, the control device is configured to control the slave-end clamp to open or clamping when the driving shaft 42 interferes with the driving groove 43 and moves within the driving groove 43.

Unless otherwise defined, technical and scientific terms used herein have the same meanings as those commonly understood by those skilled in the art. The terms used herein are only used for describing specific embodiments and not intended to limit the present disclosure. Features described herein in one embodiment may be applied to another embodiment alone or in combination with other features, unless the features are not applicable in the another embodiment or otherwise noted.

The present disclosure has been described by way of the above-described embodiments, but it should be understood that the above-described embodiments are only for the purpose of illustration and description and are not intended to limit the present disclosure to the scope of the described embodiments. In addition, it should be understood by those skilled in the art that the present disclosure is not limited to the above-described embodiments, and that more variations and modifications may be made in accordance with the teachings of the present disclosure, all of these variations and modifications falling within the protection scope of the present disclosure. The protection scope of the present disclosure is defined by the appended claims and their equivalent scope.

What is claimed is:

1. A master-end operating device for a surgical robot, comprising:
    a device body;
    a pair of operating mechanisms, pivotably connected to the device body, and disposed at two opposite sides of the device body respectively, wherein each respective operating mechanism of the operating mechanisms is provided with a respective driving part;
    a movable member, at least partially disposed within the device body and configured to be movable in an axial direction of the device body, wherein the movable member is provided with follower parts, each respective follower part of the follower parts interferes with the respective driving part to enable the movable member to be movable in the axial direction under an action of the respective operating mechanism, the respective follower part has a first constraint surface, and the first constraint surface includes, along a starting end to a terminal end of the first constraint surface, at least one bent portion recessed toward a central plane of the device body; and
    an elastic member, configured to provide an elastic force to drive the movable member toward a top end of the master-end operating device.

2. The master-end operating device according to claim 1, wherein the first constraint surface includes a first constraint segment from the starting end to the at least one bent portion, and a second constraint segment from the at least one bent portion to the terminal end, and a slope at a junction between the first constraint segment and the at least one bent portion is smaller than a slope at a junction between the at least one bent portion and the second constraint segment with respect to a radial cross section of the device body.

3. The master-end operating device according to claim 2, wherein at least one of the first constraint segment and the second constraint segment is a flat or curved surface.

4. The master-end operating device according to claim 2, wherein the respective follower part further has a second constraint surface spaced from the first constraint surface, a space for accommodation and movement of the respective driving part is defined between the second constraint surface and the first constraint surface, and an included angle is formed between the second constraint surface and the radial cross section.

5. The master-end operating device of claim 4, wherein the second constraint surface includes a third constraint segment and a fourth constraint segment connected to the third constraint segment, the third constraint segment opposite the first constraint segment, the fourth constraint segment opposite the second constraint segment, and the second constraint surface being disposed parallel to the first constraint surface.

6. The master-end operating device according to claim 5, wherein the respective driving part includes a driving shaft disposed between the first constraint surface and the second constraint surface.

7. The master-end operating device according to claim 1, wherein the movable member includes:
    a movable block, disposed in the device body, the follower parts being disposed on the movable block, and an outer periphery of the movable block being restricted by an inner periphery of the device body; and
    a movable rod, extending out of the device body in a direction away from the top end from the movable block.

8. The master-end operating device according to claim 7, wherein:
    a through hole is defined at a top of the device body;
    the movable rod penetrates the movable block, extends to the top end, and extends into the through hole; and
    the master-end operating device further includes a positioning sleeve extending into the through hole and sleeved on the movable rod, an outer periphery of the positioning sleeve being restricted by an inner periphery of the through hole.

9. The master-end operating device according to claim 7, wherein the elastic member is configured as a compression spring; and
    wherein the master-end operating device includes a mounting base, the mounting base is disposed in the device body, and is farther away from the top end of the master-end operating device than the movable block, and the elastic member is connected between the movable block and the mounting base, or
    wherein the elastic member is connected between the pair of operating mechanisms and the device body.

10. The master-end operating device according to claim 1, wherein at least one of:
    the pair of operating mechanisms is symmetrical about a central plane of the master-end operating device; and
    the respective operating mechanism includes a body and a finger cuff disposed on the body.

11. The master-end operating device according to claim 1, wherein an included angle $\alpha$ between a tangent line of the first constraint surface at the starting end and a radial cross section of the device body satisfies: $\alpha \geq 10°$.

12. The master-end operating device according to claim 11, wherein the included angle $\alpha$ satisfies: $10° \leq \alpha \leq 20°$.

13. A surgical robot, comprising:
    a slave-end clamp;
    the master-end operating device according to claim 1, wherein the respective follower part of the master-end operating device includes the first constraint surface having a first constraint segment and a second constraint segment; and
    a control device, signally connected to the master-end operating device and the slave-end clamp and configured to:
        in response to the respective driving part interfering with the first constraint segment and moving in a direction toward the second constraint segment, control the slave-end clamp to gradually transition from an open state to a clamping state;
        in response to the respective driving part being located at a joint of the first constraint segment and the second constraint segment, control the slave-end clamp to transition into the clamping state; and
        in response to the respective driving part interfering with the second constraint segment and moving in a direction away from the first constraint segment, control a clamping force of the slave-end clamp to gradually increase.

* * * * *